United States Patent
Guo et al.

(10) Patent No.: US 11,989,908 B2
(45) Date of Patent: May 21, 2024

(54) VISUAL POSITIONING METHOD, MOBILE MACHINE USING THE SAME, AND COMPUTER READABLE STORAGE MEDIUM

(71) Applicant: UBKang (Qingdao) Technology Co., Ltd., Qingdao (CN)

(72) Inventors: Rui Guo, Shenzhen (CN); Zhanjia Bi, Shenzhen (CN); Youjun Xiong, Shenzhen (CN)

(73) Assignee: UBKANG (QINGDAO) TECHNOLOGY CO., LTD., Qingdao (CN)

( * ) Notice: Subject to any disclaimer, the term of this patent is extended or adjusted under 35 U.S.C. 154(b) by 372 days.

(21) Appl. No.: 17/488,343

(22) Filed: Sep. 29, 2021

(65) Prior Publication Data
US 2022/0392103 A1    Dec. 8, 2022

(30) Foreign Application Priority Data
Jun. 3, 2021    (CN) .......................... 202110618509.2

(51) Int. Cl.
G06T 7/73    (2017.01)
G06T 7/13    (2017.01)
G06T 7/136    (2017.01)

(52) U.S. Cl.
CPC .................. *G06T 7/73* (2017.01); *G06T 7/13* (2017.01); *G06T 7/136* (2017.01); *G06T 2207/20164* (2013.01)

(58) Field of Classification Search
None
See application file for complete search history.

(56) References Cited

U.S. PATENT DOCUMENTS

| | | | |
|---|---|---|---|
| 11,348,269 B1* | 5/2022 | Ebrahimi Afrouzi | G06T 7/33 |
| 2015/0212521 A1* | 7/2015 | Pack | G06T 7/277 |
| | | | 701/28 |
| 2020/0226762 A1* | 7/2020 | Milovanovic | G06T 7/73 |

FOREIGN PATENT DOCUMENTS

| | | | | |
|---|---|---|---|---|
| CN | 105678304 A | | 6/2016 | |
| CN | 109376734 A | | 2/2019 | |
| CN | 111899334 A | * | 11/2020 | G06K 9/6218 |

OTHER PUBLICATIONS

Bellavia, F., Tegolo, D., & Valenti, C. (2011). Improving harris corner selection strategy. IET Computer Vision, 5(2), 87-96. Retrieved from https://www.proquest.com/scholarly-journals/improving-harris-corner-selection-strategy/docview/1626671171/se-2 (Year: 2011).*

* cited by examiner

*Primary Examiner* — Siamak Harandi
*Assistant Examiner* — Caroline Tabancay Duffy (57) ABSTRACT

A visual positioning method and a mobile machine using the same are provided. The method includes: extracting a plurality of corner feature points corresponding to a current image; determining whether a distance between each pair of the plurality of corner feature points is less than a first preset threshold; if yes, determining whether a grayscale value of each of the plurality of corner feature points with the distance less than the first preset threshold is within a second preset threshold range; if yes, obtaining cluster set(s) of the corner feature points; screening a plurality of valid feature points from the cluster set(s); determining a positioning reliability based on a ratio of amount of the valid feature points to an amount of the plurality of corner feature points; and if the positioning reliability is within a preset range, performing a visual positioning based on the positioning reliability.

20 Claims, 7 Drawing Sheets

VISUAL POSITIONING METHOD, MOBILE MACHINE USING THE SAME, AND COMPUTER READABLE STORAGE MEDIUM

CROSS REFERENCE TO RELATED APPLICATIONS

The present disclosure claims priority to Chinese Patent Application No. 202110618509.2, filed Jun. 3, 2021, which is hereby incorporated by reference herein as if set forth in its entirety.

BACKGROUND

1. Technical Field

The present disclosure relates to image data processing technology, and particular a visual positioning method, a mobile machine using the same, and a computer readable storage medium.

2. Description of Related Art

A robot equipped with a vision sensor performs mapping and navigation in the scene where it is located cannot evaluate the positioning reliability in the scene based on the regional distribution characteristics of common visual plane features in a real time manner. Moreover, since the feature points of the visual plane features obtained during the mapping and navigation are random, it will be impossible to measure the current robustness of the mapping and navigation of the robot, and will be impossible to take corresponding early warning and remedial measures in time by, for example, disposing specific markers (e.g., two-dimensional codes) in the scene or adding other perception assistance equipment in advance so as to urgently avoid the dangerous areas with sparse visual features or poor positioning stability. Therefore, it merely relies on humans to check the quality of the built map or long-term monitor whether the robot has abnormal navigation behavior caused by positioning drift or loss for a long time, and is costly and inefficient.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be noted that, the drawings in the following description merely show some embodiments. For those skilled in the art, other drawings may be obtained according to the drawings without creative efforts.

DETAILED DESCRIPTION

In order to make the objectives, technical solutions, and advantages of the present disclosure clearer, the following further describes the present disclosure in detail with reference to the drawings and embodiments. It should be noted that, the embodiments described herein are only for explaining the present disclosure, and are not used to limit thereto.

Figure 1:
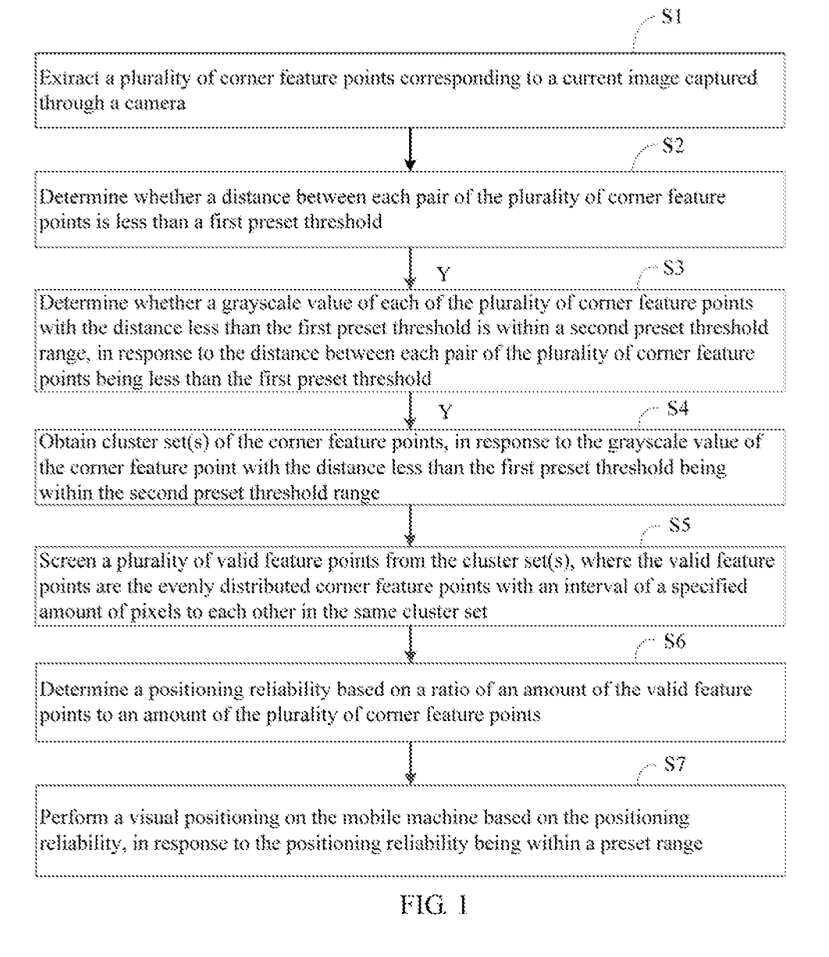
FIG. 1 is a flow chart of a visual positioning method according to an embodiment of the present disclosure.

FIG. 1 is a flow chart of a visual positioning method according to an embodiment of the present disclosure. A visual positioning method is provided. In this embodiment, the visual positioning method is a computer-implemented method executable for a processor, which may be applied to a mobile machine (e.g. a robot or a vehicle) having a camera. The method may be implemented through a visual positioning apparatus shown in FIG. 2 or a mobile machine shown in FIG. 3. As shown in FIG. 1, the method may include the following steps.

S1: extracting a plurality of corner feature points corresponding to a current image captured through the camera;

S2: determining whether a distance between each pair of the plurality of corner feature points is less than a first preset threshold;

S3: determining whether a grayscale value of each of the plurality of corner feature points with the distance less than the first preset threshold is within a second preset threshold range, in response to the distance between each pair of the plurality of corner feature points being less than the first preset threshold;

S4: obtaining cluster sets) of the corner feature points, in response to the grayscale value of the corner feature point with the distance less than the first preset threshold being within the second preset threshold range;

S5: screening a plurality of valid feature points from the cluster set(s), where the valid feature points are the evenly distributed corner feature points with an interval of a specified amount of pixels to each other in the same cluster set;

S6: determining a positioning reliability based on a ratio of an amount of the valid feature points to an amount of the plurality of corner feature points; and S7: performing a visual positioning on the mobile machine based on the positioning reliability, in response to the positioning reliability being within a preset range.

The corner feature points refer to the feature points in an image that are for positioning, for example, the intersections of various objects with different colors in the image (a white wall will be disadvantageous to positioning because no coiner points can be extracted therefrom and its feature is too unobvious). In this embodiment, the above-mentioned corner feature points may include FAST (features from accelerated segment test), ORB (Oriented FAST and Rotated BRIEF), Harris, SIFT (scale-invariant feature transform) SURF (speeded up robust features), and the like. Since the extraction of the above-mentioned corner feature points only depends on the grayscale change of the local area of the planar image and is not limited by space constraints, the distribution of the corner feature points will be overly dense in some local areas such as the vicinity of object and the periphery of lamp that have dramatic grayscale changes, which leads to weak positioning robustness.

In this embodiment the visual positioning of the mobile machine during mapping and navigation is realized on the basis of the above-mentioned corner feature points. Every time an image corresponding to the current moment is collected, a frame of current image is obtained, and the above-mentioned corner feature points are extracted from the current image and then cached. The total number of the corer feature points is denoted as N. Then, it determines whether N is larger than a number threshold for meeting the requirement of stable positioning. If N is not larger than the number threshold, it will be considered as not meeting the requirement of stable positioning, and the positioning reliability of the current image will be set to zero and output, and then the image will be enabled in the subsequent positioning. If N is larger than the number threshold, a corner point classification is performed on the corner feature points in the current image, so that the corner feature points with the same positioning effect are classified into the same cluster set. Then, in each cluster set, the corner feature points with uniform distribution and large pixel pitch are selected as valid feature points, thereby improving the robustness of positioning.

By selecting the corner feature points with large pixel pitch and uniform dispersion as the valid feature points, and by counting the ratio of the valid feature points to all the feature points, the positioning reliability of visual positioning is determined to measure the robustness of positioning. Because when the total number of the corner feature points is determined, the more even the distribution of the corner feature points and the larger the pixel pitch between each other, the stronger the robustness of positioning. The above-mentioned overly dense corner feature points not only cannot produce equivalent gain value to the robustness of positioning, but also causes the problem of the degeneration of positioning because of easy to introduce matching errors. By using the ratio between the number M of the valid feature points and the number N of originally extracted corner feature points as the position reliability, the user may be alerted in time to take corresponding remedial measures to effectively improve the efficiency of mapping and reduce the risk of navigation, and the robustness of positioning can be effectively measured. When the pixel pitch between the corner feature points is relatively large, the subsequent corner feature points will be not easy to be mistakenly matched to other nearby corner feature points after a previous corner feature point is moved, thereby avoiding matching errors to have better robustness of positioning.

In this embodiment, the corner feature points are classified and analyzed, and the valid feature points with uniform distribution and large pixel pitch are determined through downsampling, and the ratio of the valid feature points to all the extracted corner feature points is used as the positioning reliability, thereby measuring the robustness of positioning.

Figure 4:
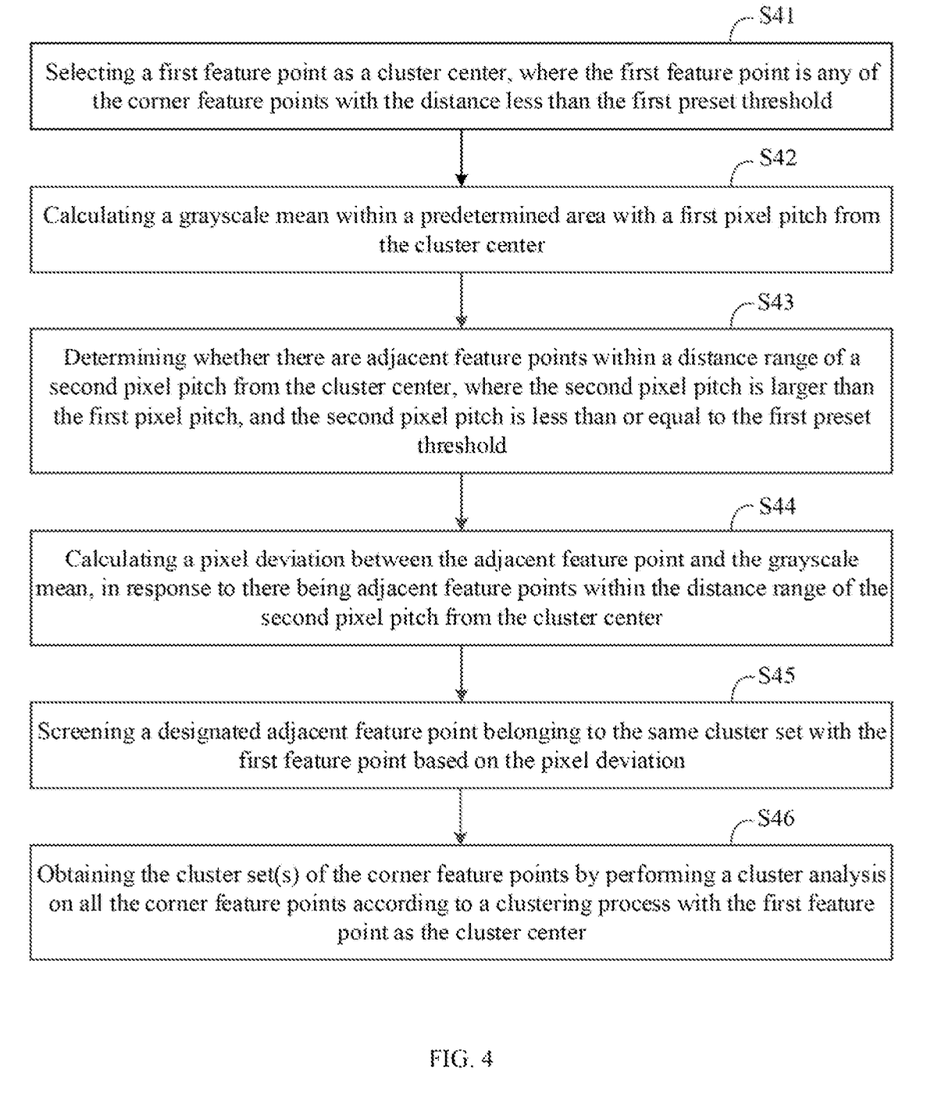
FIG. 4 is a flow chart of step S4 in FIG. 1.

Furthermore, as shown in FIG. 4, the step S4 of obtaining the cluster set(s) of the corner feature points includes:

S41: selecting a first feature point as a cluster center, where the first feature point is any of the corner feature points with the distance less than the first preset threshold;

S42: calculating a grayscale mean within a predetermined area with a first pixel pitch from the cluster center;

S43: determining whether there are adjacent feature points within a distance range of a second pixel pitch from the cluster center, where the second pixel pitch is larger than the first pixel pitch, and the second pixel pitch is less than or equal to the first preset threshold;

S44: calculating a pixel deviation between the adjacent feature point and the grayscale mean, in response to there being adjacent feature points within the distance range of the second pixel pitch from the cluster center;

S45: screening a designated adjacent feature point belonging to the same cluster set with the first feature point based on the pixel deviation (the objects in the same cluster set that have high similarity usually represent the same object/target); and S46: obtaining the cluster set(s) of the corner feature points by performing a cluster analysis on all the corner feature points according to a clustering process with the first feature point as the cluster center.

In this embodiment, the above-mentioned first pixel pitch $S_0$ is a threshold of the minimum pixel pitch to be sampled. The above-mentioned predetermined area is centered on the cluster center, its $S_0/S_0$ rectangular area is calculated, and the grayscale mean of the above-mentioned rectangular area is calculated to take as the criteria for screening the valid feature points. The above-mentioned second pixel pitch $L_0$ is a threshold of the maximum pixel pitch to be retrieved, and all the corner feature points within the second pixel pitch are retrieved to take as the adjacent feature points. A pixel deviation calculation is performed on the above-mentioned adjacent feature points and the cluster center, and clustering is performed based on the pixel deviation to take the corner feature points with the absolute value of the pixel deviation within a predetermined deviation range as belonging to the same category as the that of the cluster center so as to merge into the same cluster set. For example, in the case that the above-mentioned $L_0=10$, $S_0=5$, the predetermined deviation range is $G_0=5$, and the pixel deviation is represented as $\blacktriangle g$, if $|\blacktriangle g|<=G_0$, the adjacent feature points and the duster centers belong to the cluster sets of different positioning equivalent corner points, and each corner feature point at the beginning of the clustering is regarded as an independent positioning equivalent corner point, the adjacent feature points are merged into the cluster set to which the duster center belongs.

Figure 5:
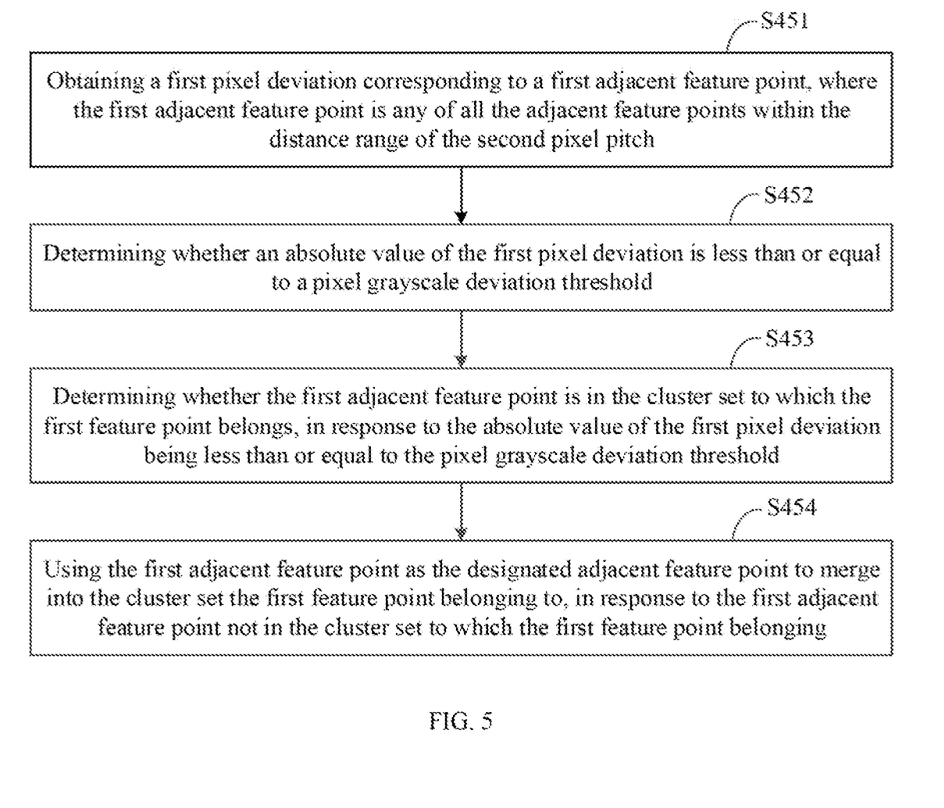
FIG. 5 is a flow chart of step S45 in FIG. 4.

Furthermore, as shown in FIG. 5, the step S45 of screening the designated adjacent feature point belong to the same cluster set with the first feature point based on the pixel deviation includes:

S451: obtaining a first pixel deviation corresponding to a first adjacent feature point, where the first adjacent feature point is any of all the adjacent feature points within the distance range of the second pixel pitch;

S452: determining whether an absolute value of the first pixel deviation is less than or equal to a pixel grayscale deviation threshold;

S453: determining whether the first adjacent feature point is in the cluster set to which the first feature point belongs, in response to the absolute value of the first pixel deviation being less than or equal to the pixel grayscale deviation threshold and S454: using the first adjacent feature point as the designated adjacent feature point to merge into the cluster set that the first feature point belongs to, in response to the first adjacent feature point not being in the cluster set to which the first feature point belongs.

In this embodiment, at the beginning of clustering, each corner feature point is treated as an independent clustering to process by determining the duster center, the grayscale mean corresponding to the cluster center and the set of adjacent feature points corresponding to the cluster center so as to realize the clustering of the cluster set corresponding to the cluster center, and so on until the number of the cluster sets of all the corner feature points corresponding to the entire current image no longer changes, and then the cluster analysis of the corner feature points is terminated. The grayscale mean corresponding to each feature point is the mean of the pixels in the $S_0/S_0$ rectangular area centered thereon. The above-mentioned predetermined deviation range is the pixel grayscale deviation threshold for determining whether two feature points belong to the boundary of the same object. The absolute values of the deviations of the grayscale means corresponding to the two feature points are compared, and if the above-mentioned absolute value is less than or equal to the pixel grayscale deviation threshold, the two feature points will be considered to be in a similar environment and on the boundary of the same object. Compared with determining the environmental similarity of the two feature points through the grayscale of each feature point itself, it has better robustness. In which, the "first", "second" and the like are used for distinction only, not for limitation or ranking, and similar terms in other places have the same function and will not be repeated herein.

Figure 6:
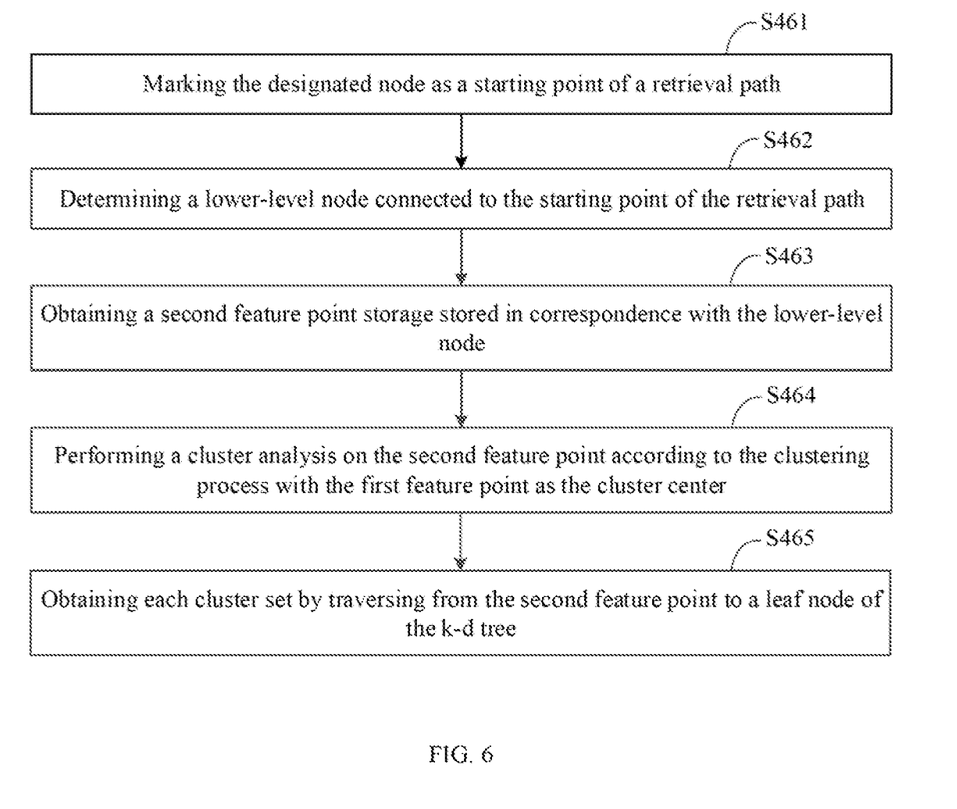
FIG. 6 is a flow chart of step S46 in FIG. 4.

Furthermore, all the corner feature points may be respectively stored in a k-d tree, and the first feature point is stored in a designated node of the k-d tree. As shown in FIG. 6. the step S46 of obtaining the cluster set(s) of the corner feature points by performing the cluster analysis on all the corner feature points according to the clustering process with the first feature point as the cluster center may include:

S461: marking the designated node as a starting point of a retrieval path;

S462: determining a lower-level node connected to the starting point of the retrieval path;

S463: obtaining a second feature point stored in correspondence with the lower-level node;

S464: performing a cluster analysis on the second feature point according to the clustering process with the first feature point as the cluster center; and S465: obtaining each cluster set by traversing from the second feature point to a leaf node of the k-d tree.

In this embodiment, the corner feature points of the current image are cached on one k-d tree (short for k-dimensional tree), which facilitates retrieval and avoids missed detection. Each time a corner feature point is extracted, a one-to-one correspondence caching is performed according to the node connection order of the k-d tree, that is, one node stores one corner feature point. In the cluster analysis, the root node of the k-d tree is used as the starting node, and the analysis is carried out step by step to the leaf node. The process of the duster analysis of the corner feature point corresponding to each node is as described above, which will not be repeated herein.

Figure 7:
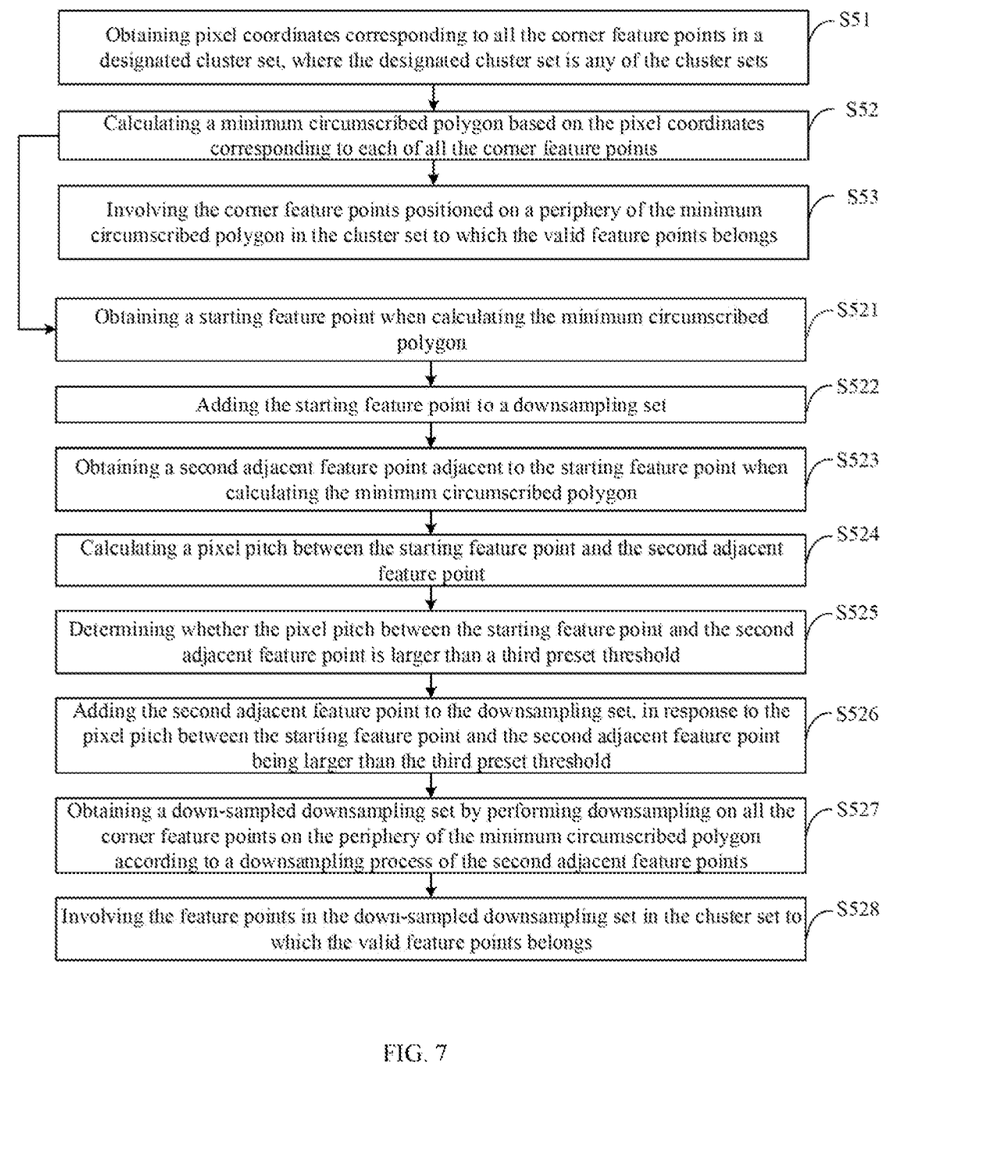
FIG. 7 is a flow chart of step S5 in FIG. 1.

Furthermore, as shown in FIG. 7, the step S5 of the screening the plurality of valid feature points from the cluster set may include:

S51: obtaining pixel coordinates corresponding to all the corner feature points in a designated cluster set, where the designated cluster set is any of the cluster sets;

S52: calculating a minimum circumscribed polygon based on the pixel coordinates corresponding to each of all the corner feature points; and S53: involving the corner feature points positioned on a periphery of the minimum circumscribed polygon in the cluster set to which the valid feature points belong.

In this embodiment, the corner feature points in each cluster set have similar positioning equivalence. There is no need to use all the corner feature points in a certain cluster set which leads to poor positioning robustness during positioning. In a certain cluster set, the calculation of the minimum circumscribed polygon is performed according to the pixel coordinates corresponding to each corner feature point. The positioning tends to identify the uniqueness of the object in the scene, and the higher the probability of the uniqueness of the object, the higher the recognizability of the scene. The corner feature points are generally positioned on the boundary of the object. Theoretically, the more feature points on the boundary, the better the contour shape of the object can be fitted, and the more unique and recognizable the object can be expressed. By calculating the minimum circumscribed polygon, the corner feature points on the edge contour of the object are determined to take as the valid feature points, thereby measuring the robustness of positioning.

Furthermore, as shown in FIG. 7, after the step S52 of calculating the minimum circumscribed polygon based on the pixel coordinates corresponding to each of all the corner feature points, the visual positioning method may further include:

S521: obtaining a starting feature point when calculating the minimum circumscribed polygon;

S522: adding the starting feature point to a downsampling set;

S523: obtaining a second adjacent feature point adjacent to the starting feature point when calculating the minimum circumscribed polygon S524: calculating a pixel pitch between the starting feature point and the second adjacent feature point;

S525: determining whether the pixel pitch between the starting feature point and the second adjacent feature point is larger than a third preset threshold;

S526: adding the second adjacent feature point to the downsampling set, in response to the pixel pitch between the starting feature point and the second adjacent feature point being larger than the third preset threshold;

S527: obtaining a down-sampled downsampling set by performing downsampling on all the corner feature points on the periphery of the minimum circumscribed polygon according to a downsampling process of the second adjacent feature points; and S528: involving the feature points in the down-sampled downsampling set in the cluster set to which the valid feature points belong.

The step S527 of obtaining the down-sampled downsampling set by performing downsampling on all the corner feature points on the periphery of the minimum circumscribed polygon according to the downsampling process of the second adjacent feature points includes:

obtaining a third adjacent feature point adjacent to the second adjacent feature point when calculating the minimum circumscribed polygon;

calculating a pixel pitch between the starting feature point and the third adjacent feature point, and a pixel pitch between the second adjacent feature point and the third adjacent feature point;

determining whether the pixel pitch between the starting feature point and the third adjacent feature point and that between the second adjacent feature point and the third adjacent feature point are both larger than the third preset threshold;

if yes, adding the third adjacent feature point to the downsampling set; and obtaining the down-sampled downsampling set by downsampling all the corner feature points on the periphery of the minimum circumscribed polygon according to the downsampling process of the second adjacent feature point and the third adjacent feature point.

In this embodiment, in order to further optimize the corner feature points for positioning, the corner feature points on the minimum circumscribed polygon are down-sampled. The above-mentioned downsampling is performed according to the pixel pitch, which take not only the pixel difference between the corner feature points but also the pixel pitch therebetween into account at the same time.

If the starting feature point when calculating the minimum circumscribed polygon is involved in the downsampling set, then the starting feature point is considered to be the valid feature point, and then the feature points on the minimum circumscribed polygon that are adjacent to the starting feature point are evaluated, that is, the pixel distance between the adjacent feature point and the starting feature point is calculated. If the pixel distance is larger than the preset pitch threshold, the adjacent feature point will be involved in the downsampling set, and the starting feature point and the adjacent feature point in the current downsampling set will be used together as the analysis standard to analyze whether other feature points on the minimum circumscribed polygon that are adjacent to the adjacent feature point meet a downsampling standard, that is, the pixel pitch between the starting feature point and other features point as well as that between the adjacent feature point and other features point are both larger than the preset pitch threshold. If yes, they are involved in the downsampling set; otherwise, the corner feature points are discarded until all the corner feature points on the minimum circumscribed polygon are analyzed and the final downsampling set is obtained, which further reduces the number of the valid feature points, further improves the pixel pitch between the valid feature points, and further effectively measures the robustness of positioning.

For example, assuming that all the corner feature points on the minimum circumscribed polygon are successively feature point 1 to feature point 6, where feature point 1 is the starting feature point, and the preset threshold of the above-mentioned pixel pitch is 5. Because the pixel pitch between feature point 1 and feature point 2 is 4 which is less than the preset threshold of 5, feature point 2 will be discarded. Moreover, because the pixel pitch between feature point 1 and feature point 3 is calculated to be 8 which is larger than the preset threshold of 5, feature point 3 is involved in the downsampling set. At this time, the downsampling set includes feature point 1 and feature point 3, then feature point 4 is analyzed according to feature point 1 and feature point 3, and then the pixel pitch between feature point 1 and feature point 4 is calculated to be 10. Because the pixel pitch between feature point 3 and feature point 4 is 3, feature point 4 should be discarded due to not meeting the requirement. Then, feature point 5 is analyzed according to feature point 1 and feature point 3, and the pixel pitch between feature point 1 and feature point 5 is calculated to be 9. Because the pixel pitch between feature point 3 and feature point 5 is 7, feature point 5 meets the requirement and should be involved in the downsampling set. At this time, the downsampling set includes feature points 1, 3 and 5, then feature point 6 is analyzed according to feature points 1, 3 and 5, and then the pixel distance between feature point 5 and feature point 6 is calculate to be 3, hence feature point 6 will be discarded, and the valid feature points in the final downsampling set are feature points 1, 3 and 5.

Figure 2:
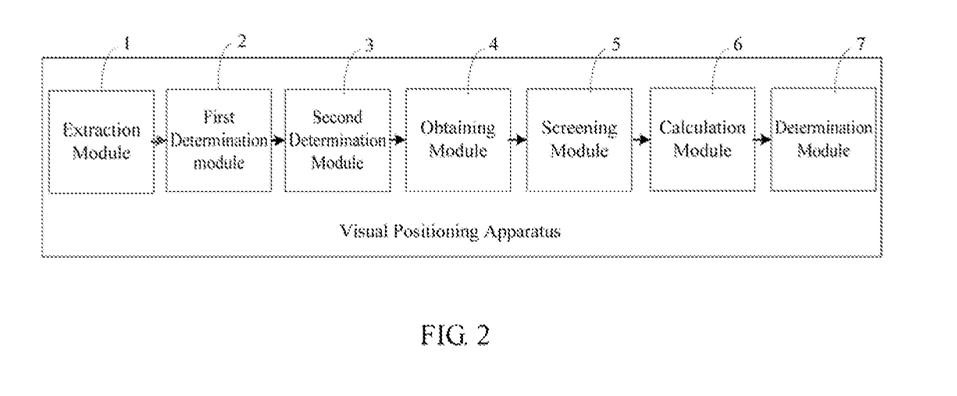
FIG. 2 is a schematic block diagram of a visual positioning apparatus according to an embodiment of the present disclosure.

FIG. 2 is a schematic block diagram of a visual positioning apparatus according to an embodiment of the present disclosure. In this embodiment, a visual positioning apparatus is provided, which may be applied to a mobile machine shown in FIG. 3. As shown in FIG. 2, the visual positioning apparatus may include:

an extraction module 1 configured to extract a plurality of corner feature points corresponding to a current image captured through the camera;

a first determination module 2 configured to determine whether a distance between each pair of the plurality of corner feature points is less than a first preset threshold;

a second determination module 3 configured to determine whether a grayscale value of each of the plurality of corner feature points with the distance less than the first preset threshold is within a second preset threshold range, in response to the distance between each pair of the plurality of corner feature points being less than the first preset threshold;

an obtaining module 4 configured to obtain one or more cluster sets of the corner feature points, in response to the grayscale value of the corner feature point with the distance less than the first preset threshold being within the second preset threshold range;

a screening module 5 configured to screen a plurality of valid feature points from the one or more cluster sets, where the valid feature points are the evenly distributed corner feature points with an interval of a specified amount of pixels to each other in the same cluster set;

a calculation module 6 configured to determine a positioning reliability based on a ratio of an amount of the valid feature points to an amount of the plurality of corner feature points; and a determination module 7 configured to perform a visual positioning on the mobile machine based on the positioning reliability, in response to the positioning reliability being within a preset range.

For the corresponding descriptions of the modules and units in this embodiment, refer to the corresponding descriptions in the corresponding method embodiment, which will not be repeated herein.

Furthermore, the obtaining module 4 may include:

a selection unit configured to select a first feature point as a cluster center, where the first feature point is any of the corner feature points with the distance less than the first preset threshold;

a first calculation unit configured to calculate a grayscale mean within a predetermined area with a first pixel pitch from the cluster center;

a determination unit configured to determine whether there are adjacent feature points within a distance range of a second pixel pitch from the cluster center, where the second pixel pitch is larger than the first pixel pitch, and the second pixel pitch is less than or equal to the first preset threshold;

a second calculation unit configured to calculate a pixel deviation between the adjacent feature point and the grayscale mean, in response to there being adjacent feature points within the distance range of the second pixel pitch from the cluster center;

a screening unit configured to screen a designated adjacent feature point belonging to the same cluster set with the first feature point based on the pixel deviation; and a clustering unit configured to obtain the one or more cluster sets of the corner feature points by performing a cluster analysis on all the corner feature points according to a clustering process with the first feature point as the cluster center.

Furthermore, the screening unit may include:

a first obtaining subunit configured to obtain a first pixel deviation corresponding to a first adjacent feature point, where the first adjacent feature point is any of all the adjacent feature points within the distance range of the second pixel pitch;

a first determination subunit configured to determine whether an absolute value of the first pixel deviation is less than or equal to a pixel grayscale deviation threshold;

a second determination subunit configured to determine whether the first adjacent feature point is in the cluster set to which the first feature point belongs, in response to the absolute value of the first pixel deviation being less than or equal to the pixel grayscale deviation threshold; and a merging subunit configured to use the first adjacent feature point as the designated adjacent feature point to merge into the cluster set that the first feature point belongs to, in response to the first adjacent feature point not being in the cluster set to which the first feature point belongs.

Furthermore, all the corner feature points may be respectively stored in a k-d tree, and the first feature point is stored in a designated node of the k-d tree. The clustering unit may include:

a marking subunit configured to mark the designated node as a starting point of a retrieval path;

a determining subunit configured to determine a lower-level node connected to the starting point of the retrieval path;

a second obtaining subunit configured to obtain a second feature point stored in correspondence with the lower-level node;

a clustering subunit configured to perform a cluster analysis on the second feature point according to the clustering process with the first feature point as the cluster center; and a traversing subunit configured to obtain each cluster set by traversing from the second feature point to a leaf node of the k-d tree.

Furthermore, the screening module 5 may include:

a first obtaining unit configured to obtain pixel coordinates corresponding to all the corner feature points in a designated cluster set, where the designated cluster set is any of the cluster sets;

a third calculation unit configured to calculate a minimum circumscribed polygon based on the pixel coordinates corresponding to each of all the corner feature points; and a first involving unit configured to involve the corner feature points positioned on a periphery of the minimum circumscribed polygon in the cluster set to which the valid feature points belong.

Furthermore, the screening module 5 may further include:

a second obtaining unit configured to obtain a starting feature point when calculating the minimum circumscribed polygon;

a first adding unit configured to add the starting feature point to a downsampling set;

a fourth calculation unit configured to obtain a second adjacent feature point adjacent to the starting feature point when calculating the minimum circumscribed polygon;

a fifth calculation unit configured to calculate a pixel pitch between the starting feature point and the second adjacent feature point;

a second determining unit configured to determine whether the pixel pitch between the starting feature point and the second adjacent feature point is larger than a third preset threshold;

a first adding unit configured to add the second adjacent feature point to the downsampling set, in response to the pixel pitch between the starting feature point and the second adjacent feature point being larger than the third preset threshold;

a down-sampled downsampling set obtaining unit configured to obtain a down-sampled downsampling set by performing, downsampling on all the corner feature points on the periphery of the minimum circumscribed polygon according to a downsampling process of the second adjacent feature points; and a second involving unit configured to involve the feature points in the down-sampled downsampling set in the cluster set to which the valid feature points belong.

Furthermore, the visual positioning apparatus may further include:

a third obtaining unit configured to obtain a third adjacent feature point adjacent to the second adjacent feature point when calculating the minimum circumscribed polygon;

a sixth obtaining unit configured to calculate a pixel pitch between the starting feature point and the third adjacent feature point, and a pixel pitch between the second adjacent feature point and the third adjacent feature point;

a third determination unit configured to determine whether the pixel pitch between the starting feature point and the third adjacent feature point and that between the second adjacent feature point and the third adjacent feature point are both larger than the third preset threshold;

a second adding unit configured to add the third adjacent feature point to the downsampling set in response to the pixel pitch between the starting feature point and the third adjacent feature point and that between the second adjacent feature point and the third adjacent feature point being both larger than the third preset threshold; and a downsampling unit configured to obtaining the down-sampled downsampling set by downsampling all the corner feature points on the periphery of the minimum circumscribed polygon according to the downsampling process of the second adjacent feature point and the third adjacent feature point.

Figure 3:
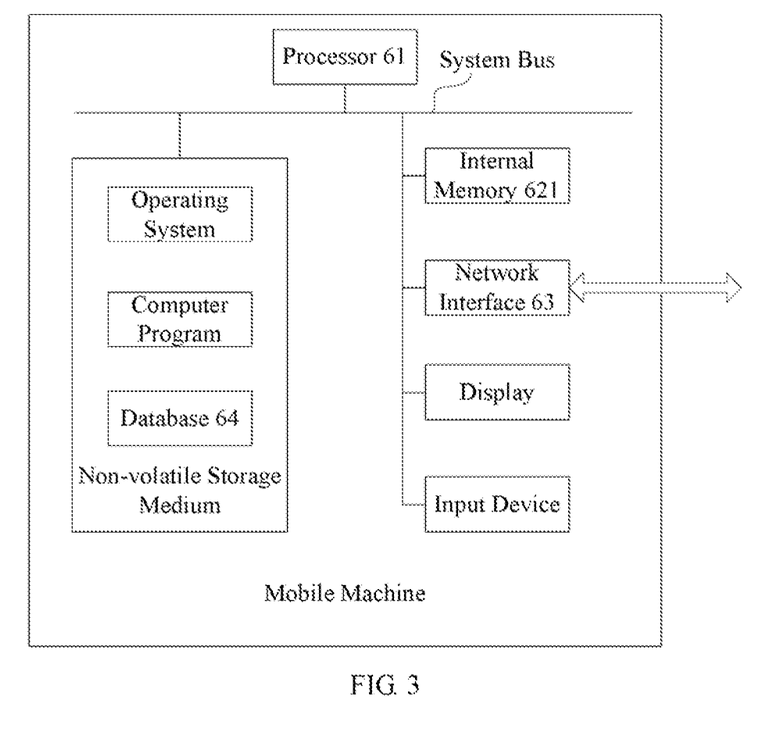
FIG. 3 is a schematic block diagram of a mobile machine according to an embodiment of the present disclosure.

FIG. 3 is a schematic block diagram of a mobile machine according to an embodiment of the present disclosure. A mobile machine (e.g., a robot or a vehicle) is provided. As shown in FIG. 3, the computing device includes a processor 61, a storage, a network interface 63, and a database 64 which are connected via a system bus. In which, the processor 61 is for realizing calculations and controls. The storage includes a non-volatile storage medium and an internal memory 621. The non-volatile storage medium stores an operating system, a computer program, and the database 64. The internal memory 621 provides an environment for the execution of the operating system and computer program in the non-volatile storage medium. The database 64 is for storing all the data required during visual positioning. The network interface 63 is for connecting and communicating with an external terminal via a network. When the computer program is executed by the processor 61, the above-mentioned visual positioning method is implemented.

The processor 61 executes the above-mentioned visual positioning method which includes: extracting a plurality of corner feature points corresponding to a current image captured through the camera; determining whether a distance between each pair of the plurality of corner feature points is less than a first preset threshold; determining whether a grayscale value of each of the plurality of corner feature points with the distance less than the first preset threshold is within a second preset threshold range, in response to the distance between each pair of the plurality of corner feature points being less than the first preset threshold; obtaining one or more cluster sets of the corner feature points, in response to the grayscale value of the corner feature point with the distance less than the first preset threshold being within the second preset threshold range; screening a plurality of valid feature points from the one or more cluster sets, where the valid feature points are the evenly distributed corner feature points with an interval of a specified amount of pixels to each other in the same cluster set; determining a positioning reliability based on a ratio of an amount of the valid feature points to an amount of the plurality of corner feature points; and performing a visual positioning on the mobile machine based on the positioning reliability, in response to the positioning reliability being within a preset range.

The above-mentioned mobile machine classifies and analyzes the corner feature points, performs downsampling through a preset algorithm so as to determine the valid feature points with uniform distribution and large pixel pitch, and uses the ratio of the valid feature points to all the extracted corner feature points as the positioning reliability to measure the robustness of positioning.

Those skilled in the art can understand that, the structure shown in FIG. 3 is only a part of the structure related to the solution of the present disclosure, and does not constitute a limitation on the mobile machine to which the solution of the present disclosure is applied.

In one embodiment, a non-transitory computer readable storage medium storing with computer program is provided. When the computer program is executed by a processor, a visual positioning method is realized. The method includes: extracting a plurality of corner feature points corresponding to a current image captured through a camera of a mobile machine (e.g., the above-mentioned mobile machine of FIG. 3); determining whether a distance between each pair of the plurality of corner feature points is less than a first preset threshold; determining whether a grayscale value of each of the plurality of corner feature points with the distance less than the first preset threshold is within a second preset threshold range, in response to the distance between each pair of the plurality of corner feature points being less than the first preset threshold; obtaining one or more cluster sets of the corner feature points, in response to the grayscale value of the corner feature point with the distance less than the first preset threshold being within the second preset threshold range, screening a plurality of valid feature points from the one or more cluster sets, where the valid feature points are the evenly distributed corner feature points with an interval of a specified amount of pixels to each other in the same cluster set; determining a positioning reliability based on a ratio of an amount of the valid feature points to an amount of the plurality of corner feature points; and performing a visual positioning on the mobile machine based on the positioning reliability, in response to the positioning reliability being with in a preset range.

The above-mentioned computer-readable storage medium classifies and analyzes the corner feature points, performs downsampling through a preset algorithm so as to determine the valid feature points with uniform distribution and large pixel pitch, and uses the ratio of the valid feature points to all the extracted corner feature points as the positioning reliability to measure the robustness of positioning.

It can be understood by those skilled in the an that, all or part of the process of the method of the above-mentioned embodiment can be implemented by a computer program to instruct related hardware. The program can be stored in a non-volatile computer readable storage medium. When the program is executed, which can include the process of each method embodiment as described above. In which, any reference to a storage, a memory, a database or other medium used in each embodiment provided by the present disclosure may include non-volatile and/or volatile memory. Non-volatile memory can include read only memory (ROM), programmable ROM (PROM), electrically programmable ROM (EPROM), electrically erasable programmable ROM (EEPROM), or flash memory. Volatile memory can include random access memory (RAM) or external cache memory. As a description rather than a limitation, RAM can be in a variety of formats such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), rambus direct RAM (RDRAM), direct rambus DRAM (DRDRAM), and rambus DRAM. (RDRAM).

It should be noted that, in the present disclosure, the terms "comprise", "include" or any other variants hereof are intended to cover non-exclusive inclusion, so that a process, apparatus (or device), article or method including a series of elements not only includes those elements, but also includes other elements that are not explicitly listed, or elements inherent to the process, apparatus, article, or method. Unless specifically restricted, the element defined by the sentence "including a . . . " does not exclude the existence of other identical elements in the process, apparatus, article, or method that includes the element.

The foregoing are merely the embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A computer-implemented visual positioning method for a mobile machine having a camera, comprising:
    extracting a plurality of corner feature points corresponding to a current image captured through the camera;
    determining whether a distance between each pair of the plurality of corner feature points is less than a first preset threshold;
    determining whether a grayscale value of each of the plurality of corner feature points with the distance less than the first preset threshold is within a second preset threshold range, in response to the distance between each pair of the plurality of corner feature points being less than the first preset threshold;
    obtaining one or more cluster sets of the corner feature points, in response to the grayscale value of the corner feature point with the distance less than the first preset threshold being within the second preset threshold range;
    screening a plurality of valid feature points from the one or more cluster sets, wherein the valid feature points are evenly distributed corner feature points with an interval of a specified amount of pixels to each other in the same cluster set;
    determining a positioning reliability based on a ratio of an amount of the valid feature points to an amount of the plurality of corner feature points; and
    performing a visual positioning on the mobile machine based on the positioning reliability, in response to the positioning reliability being within a preset range;

wherein the obtaining the one or more cluster sets of the corner feature points comprises:
selecting a first feature point as a cluster center, wherein the first feature point is any of the corner feature points with the distance less than the first preset threshold;
calculating a grayscale mean within a predetermined area with a first pixel pitch from the cluster center;
determining whether there are adjacent feature points within a distance range of a second pixel pitch from the cluster center, wherein the second pixel pitch is larger than the first pixel pitch, and the second pixel pitch is less than or equal to the first preset threshold;
calculating a pixel deviation between the adjacent feature point and the grayscale mean, in response to there being adjacent feature points within the distance range of the second pixel pitch from the cluster center;
screening a designated adjacent feature point belonging to the same cluster set with the first feature point based on the pixel deviation; and
obtaining the one or more cluster sets of the corner feature points by performing a cluster analysis on all the corner feature points according to a clustering process with the first feature point as the cluster center.

2. The method of claim 1, wherein the screening the designated adjacent feature point belonging to the same cluster set with the first feature point based on the pixel deviation comprises:
obtaining a first pixel deviation corresponding to a first adjacent feature point, wherein the first adjacent feature point is any of all the adjacent feature points within the distance range of the second pixel pitch;
determining whether an absolute value of the first pixel deviation is less than or equal to a pixel grayscale deviation threshold;
determining whether the first adjacent feature point is in the cluster set to which the first feature point belongs, in response to the absolute value of the first pixel deviation being less than or equal to the pixel grayscale deviation threshold; and
using the first adjacent feature point as the designated adjacent feature point to merge into the cluster set that the first feature point belongs to, in response to the first adjacent feature point not being in the cluster set to which the first feature point belongs.

3. The method of claim 2, wherein all the corner feature points are respectively stored in a k-d tree, and the first feature point is stored in a designated node of the k-d tree: and wherein the obtaining the one or more cluster sets of the corner feature points by performing the cluster analysis on all the corner feature points according to the clustering process with the first feature point as the cluster center comprises:
marking the designated node as a starting point of a retrieval path;
determining a lower-level node connected to the starting point of the retrieval path;
obtaining a second feature point stored in correspondence with the lower-level node;
performing a cluster analysis on the second feature point according to the clustering process with the first feature point as the cluster center; and
obtaining each cluster set by traversing from the second feature point to a leaf node of the k-d tree.

4. The method of claim 1, wherein the screening the plurality of valid feature points from the cluster set comprises:
obtaining pixel coordinates corresponding to all the corner feature points in a designated cluster set, wherein the designated cluster set is any of the cluster sets;
calculating a minimum circumscribed polygon based on the pixel coordinates corresponding to each of all the corner feature points; and
involving the corner feature points positioned on a periphery of the minimum circumscribed polygon in the cluster set to which the valid feature points belong.

5. The method of claim 4, wherein after the calculating the minimum circumscribed polygon based on the pixel coordinates corresponding to each of all the corner feature points, the method further comprises:
obtaining a starting feature point when calculating the minimum circumscribed polygon;
adding the starting feature point to a downsampling set;
obtaining a second adjacent feature point adjacent to the starting feature point when calculating the minimum circumscribed polygon;
calculating a pixel pitch between the starting feature point and the second adjacent feature point;
determining whether the pixel pitch between the stalling feature point and the second adjacent feature point is larger than a third preset threshold;
adding the second adjacent feature point to the downsampling set, in response to the pixel pitch between the starting feature point and the second adjacent feature point being larger than the third preset threshold;
obtaining a down-sampled downsampling set by performing downsampling on all the corner feature points on the periphery of the minimum circumscribed polygon according to a downsampling process of the second adjacent feature points; and
involving the feature points in the down-sampled downsampling set in the cluster set to which the valid feature points belong.

6. The method of claim 1, wherein the determining the positioning reliability based on the ratio of the amount of the valid feature points to the amount of the plurality of corner feature points comprises:
using the ratio of the amount of the valid feature points to the amount of the plurality of corner feature points as the positioning reliability.

7. A mobile machine, comprising:
a camera;
a processor;
a memory coupled to the processor; and
one or more computer programs stored in the memory and executable on the processor;
wherein, the one or more computer programs comprise:
instructions for extracting a plurality of corner feature points corresponding to a current image captured through the camera;
instructions for determining whether a distance between each pair of the plurality of corner feature points is less than a first preset threshold;
instructions for determining whether a grayscale value of each of the plurality of corner feature points with the distance less than the first preset threshold is within a second preset threshold range, in response to the distance between each pair of the plurality of corner feature points being less than the first preset threshold;
instructions for obtaining one or more cluster sets of the corner feature points, in response to the grayscale value of the corner feature point with the distance less than the first preset threshold being within the second preset threshold range;

instructions for screening a plurality of valid feature points from the one or more cluster sets, wherein the valid feature points are evenly distributed corner feature points with an interval of a specified amount of pixels to each other in the same cluster set;

instructions for determining a positioning reliability based on a ratio of an amount of the valid feature points to an amount of the plurality of corner feature points; and instructions for performing a visual positioning on the mobile machine based on the positioning reliability, in response to the positioning reliability being within a preset range;

wherein the instructions for obtaining the one or more cluster sets of the corner feature points comprise:
  instructions for selecting a first feature point as a cluster center, wherein the first feature point is any of the corner feature points with the distance less than the first preset threshold;
  instructions for calculating a grayscale mean within a predetermined area with a first pixel pitch from the cluster center;
  instructions for determining whether there are adjacent feature points within a distance range of a second pixel aitch from the cluster center, wherein the second pixel pitch is lamer than the first pixel pitch, and the second pixel pitch is less than or equal to the first preset threshold;
  instructions for calculating a pixel deviation between the adjacent feature point and the grayscale mean, in response to there being adjacent feature points within the distance range of the second pixel pitch from the cluster center;
  instructions for screening a designated adjacent feature point belonging to the same cluster set with the first feature point based on the pixel deviation; and
  instructions for obtaining the one or more cluster sets of the corner feature points by performing a cluster analysis on all the corner feature points according to a clustering process with the first feature point as the cluster center.

8. The mobile machine of claim 7, wherein the instructions for screening the designated adjacent feature point belonging to the same cluster set with the first feature point based on the pixel deviation comprise:
  instructions for obtaining a first pixel deviation corresponding to a first adjacent feature point, wherein the first adjacent feature point is any of all the adjacent feature points within the distance range of the second pixel pitch;
  instructions for determining whether an absolute value of the first pixel deviation is less than or equal to a pixel grayscale deviation threshold;
  instructions for determining whether the first adjacent feature point is in the cluster set to which the first feature point belongs, in response to the absolute value of the first pixel deviation being less than or equal to the pixel grayscale deviation threshold; and
  instructions for using the first adjacent feature point as the designated adjacent feature point to merge into the cluster set that the first feature point belongs to, in response to the first adjacent feature point not being in the cluster set to which the first feature point belongs.

9. The mobile machine of claim 8, wherein all the corner feature points are respectively stored in a k-d tree, and the first feature point is stored in a designated node of the k-d tree: and wherein the instructions for obtaining the one or more cluster sets of the corner feature points by performing the cluster analysis on all the corner feature points according to the clustering process with the first feature point as the cluster center comprise:
  instructions for marking the designated node as a starting point of a retrieval path;
  instructions for determining a lower-level node connected to the starting point of the retrieval path;
  instructions for obtaining a second feature point stored in correspondence with the lower-level node;
  instructions for performing a cluster analysis on the second feature point according to the clustering process with the first feature point as the cluster center; and
  instructions for obtaining each cluster set by traversing from the second feature point to a leaf node of the k-d tree.

10. The mobile machine of claim 7, wherein the instructions for screening the plurality of valid feature points from the cluster set comprise:
  instructions for obtaining pixel coordinates corresponding to all the corner feature points in a designated cluster set, wherein the designated cluster set is any of the cluster sets;
  instructions for calculating a minimum circumscribed polygon based on the pixel coordinates corresponding to each of all the corner feature points; and
  instructions for involving the corner feature points positioned on a periphery of the minimum circumscribed polygon in the cluster set to which the valid feature points belong.

11. The mobile machine of claim 10, wherein the one or more computer programs further comprise:
  instructions for obtaining a starting feature point when calculating the minimum circumscribed polygon;
  instructions for adding the starting feature point to a downsampling set;
  instructions for obtaining a second adjacent feature point adjacent to the starting feature point when calculating the minimum circumscribed polygon;
  instructions for calculating a pixel pitch between the starting feature point and the second adjacent feature point;
  instructions for determining whether the pixel pitch between the starting feature point and the second adjacent feature point is larger than a third preset threshold;
  instructions for adding the second adjacent feature point to the downsampling set, in response to the pixel pitch between the starting feature point and the second adjacent feature point being larger than the third preset threshold;
  instructions for obtaining a down-sampled downsampling set by performing downsampling on all the corner feature points on the periphery of the minimum circumscribed polygon according to a downsampling process of the second adjacent feature points; and
  instructions for involving the feature points in the down-sampled downsampling set in the cluster set to which the valid feature points belong.

12. The mobile machine of claim 7, wherein the instructions for determining the positioning reliability based on the ratio of the amount of the valid feature points to the amount of the plurality of corner feature points comprise:

instructions for using the ratio of the amount of the valid feature points to the amount of the plurality of corner feature points as the positioning reliability.

13. A non-transitory computer readable storage medium for storing one or more computer programs, wherein the one or more computer programs comprise:
  instructions for extracting a plurality of corner feature points corresponding to a current image captured through a camera of a mobile machine;
  instructions for determining whether a distance between each pair of the plurality of corner feature points is less than a first preset threshold;
  instructions for determining whether a grayscale value of each of the plurality of corner feature points with the distance less than the first preset threshold is within a second preset threshold range, in response to the distance between each pair of the plurality of corner feature points being less than the first preset threshold;
  instructions for obtaining one or more cluster sets of the corner feature points, in response to the grayscale value of the corner feature point with the distance less than the first preset threshold being within the second preset threshold range;
  instructions for screening a plurality of valid feature points from the one or more cluster sets, wherein the valid feature points are evenly distributed corner feature points with an interval of a specified amount of pixels to each other in the same cluster set;
  instructions for determining a positioning reliability based on a ratio of an amount of the valid feature points to an amount of the plurality of corner feature points; and
  instructions for performing a visual positioning on the mobile machine based on the positioning reliability, in response to the positioning reliability being within a preset range;
  wherein the instructions for obtaining the one or more cluster sets of the corner feature points comprise:
    instructions for selecting a first feature point as a cluster center, wherein the first feature point is any of the corner feature points with the distance less than the first preset threshold;
    instructions for calculating a grayscale mean within a predetermined area with a first pixel pitch from the cluster center;
    instructions for determining whether there are adjacent feature points within a distance range of a second pixel pitch from the cluster center, wherein the second pixel pitch is larger than the first pixel pitch, and the second pixel pitch is less than or equal to the first preset threshold;
    instructions for calculating a pixel deviation between the adjacent feature point and the grayscale mean, in response to there being adjacent feature points within the distance range of the second pixel pitch from the cluster center;
    instructions for screening a designated adjacent feature point belonging to the same cluster set with the first feature point based on the pixel deviation; and
    instructions for obtaining the one or more cluster sets of the corner feature points by performing a cluster analysis on all the corner feature points according to a clustering process with the first feature point as the cluster center.

14. The storage medium of claim 13, wherein the instructions for screening the designated adjacent feature point belonging to the same cluster set with the first feature point based on the pixel deviation comprise:
  instructions for obtaining a first pixel deviation corresponding to a first adjacent feature point, wherein the first adjacent feature point is any of all the adjacent feature points within the distance range of the second pixel pitch;
  instructions for determining whether an absolute value of the first pixel deviation is less than or equal to a pixel grayscale deviation threshold;
  instructions for determining whether the first adjacent feature point is in the cluster set to which the first feature point belongs, in response to the absolute value of the first pixel deviation being less than or equal to the pixel grayscale deviation threshold; and
  instructions for using the first adjacent feature point as the designated adjacent feature point to merge into the cluster set that the first feature point belongs to, in response to the first adjacent feature point not being in the cluster set to which the first feature point belongs.

15. The storage medium of claim 14, wherein all the corner feature points are respectively stored in a k-d tree, and the first feature point is stored in a designated node of the k-d tree: and wherein the instructions for obtaining the one or more cluster sets of the corner feature points by performing the cluster analysis on all the corner feature points according to the clustering process with the first feature point as the cluster center comprise:
  instructions for marking the designated node as a starting point of a retrieval path;
  instructions for determining a lower-level node connected to the starting point of the retrieval path;
  instructions for obtaining a second feature point stored in correspondence with the lower-level node;
  instructions for performing a cluster analysis on the second feature point according to the clustering process with the first feature point as the cluster center; and
  instructions for obtaining each cluster set by traversing from the second feature point to a leaf node of the k-d tree.

16. The storage medium of claim 13, wherein the instructions for screening the plurality of valid feature points from the cluster set comprise:
  instructions for obtaining pixel coordinates corresponding to all the corner feature points in a designated cluster set, wherein the designated cluster set is any of the cluster sets;
  instructions for calculating a minimum circumscribed polygon based on the pixel coordinates corresponding to each of all the corner feature points; and
  instructions for involving the corner feature points positioned on a periphery of the minimum circumscribed polygon in the cluster set to which the valid feature points belong.

17. The storage medium of claim 16, wherein the one or more computer programs further comprise:
  instructions for obtaining a starting feature point when calculating the minimum circumscribed polygon: instructions for adding the starting feature point to a downsampling set;
  instructions for obtaining a second adjacent feature point adjacent to the starting feature point when calculating the minimum circumscribed polygon: instructions for calculating a pixel pitch between the starting feature point and the second adjacent feature point;
  instructions for determining whether the pixel pitch between the starting feature point and the second adjacent feature point is larger than a third preset threshold;

instructions for adding the second adjacent feature point to the downsampling set, in response to the pixel pitch between the starting feature point and the second adjacent feature point being larger than the third preset threshold;

instructions for obtaining a down-sampled downsampling set by performing downsampling on all the corner feature points on the periphery of the minimum circumscribed polygon according to a downsampling process of the second adjacent feature points; and instructions for involving the feature points in the down-sampled downsampling set in the cluster set to which the valid feature points belong.

18. The storage medium of claim 17, wherein the instructions for obtaining the down-sampled downsampling set by performing downsampling on all the corner feature points on the periphery of the minimum circumscribed polygon according to the downsampling process of the second adjacent feature points comprise:

instructions for obtaining a third adjacent feature point adjacent to the second adjacent feature point when calculating the minimum circumscribed polygon;

instructions for calculating a pixel pitch between the starting feature point and the third adjacent feature point, and a pixel pitch between the second adjacent feature point and the third adjacent feature point;

instructions for determining whether the pixel pitch between the starting feature point and the third adjacent feature point and that between the second adjacent feature point and the third adjacent feature point are both larger than the third preset threshold;

instructions for adding the third adjacent feature point to the downsampling set, in response to the pixel pitch between the starting feature point and the third adjacent feature point and that between the second adjacent feature point and the third adjacent feature point being both larger than the third preset threshold; and instructions for obtaining the down-sampled downsampling set by downsampling all the corner feature points on the periphery of the minimum circumscribed polygon according to the downsampling process of the second adjacent feature point and the third adjacent feature point.

19. The storage medium of claim 13, wherein the instructions for determining the positioning reliability based on the ratio of the amount of the valid feature points to the amount of the plurality of corner feature points comprise:

instructions for using the ratio of the amount of the valid feature points to the amount of the plurality of corner feature points as the positioning reliability.

20. The storage medium of claim 13, wherein the corner feature points comprise: features from accelerated segment test (FAST), oriented FAST and rotated binary robust independent elementary features (BRIEF), and speeded up robust features (SURF).

* * * * *